United States Patent [19]

Gell, Jr.

[11] Patent Number: 4,947,783

[45] Date of Patent: Aug. 14, 1990

[54] PRESSURE COMPENSATION METHOD AND APPARATUS FOR UNDERWATER EQUIPMENT

[75] Inventor: Harold A. Gell, Jr., Silver Spring, Md.

[73] Assignee: Sea Fathoms Industries, Inc., Silver Spring, Md.

[21] Appl. No.: 501,554

[22] Filed: Mar. 30, 1990

Related U.S. Application Data

[63] Continuation-in-part of Ser. No. 491,094, Mar. 9, 1990.

[51] Int. Cl.$^5$ .................. G03B 17/08; B63G 8/00; B63B 45/04
[52] U.S. Cl. .................... 114/312; 116/27; 354/64
[58] Field of Search .......... 354/64; 114/312; 116/27

[56] References Cited

U.S. PATENT DOCUMENTS

| | | | |
|---|---|---|---|
| 1,131,712 | 3/1915 | Klein | 114/312 |
| 3,162,107 | 12/1964 | Byers | 95/11 |
| 3,717,078 | 2/1973 | Ogura | 95/11 |
| 3,759,605 | 9/1973 | Johnson | 350/179 |
| 4,041,507 | 8/1977 | Ko et al. | 354/64 |
| 4,113,137 | 9/1978 | Wind | 220/319 |
| 4,281,343 | 7/1981 | Monteiro | 358/99 |
| 4,763,145 | 8/1988 | Takamura et al. | 354/64 |
| 4,771,299 | 9/1988 | Gell, Jr. | 354/64 |
| 4,771,320 | 9/1988 | Gell | 354/64 |
| 4,853,722 | 8/1989 | Gell, Jr. | 354/64 |

FOREIGN PATENT DOCUMENTS

| 2926224 | 1/1980 | Fed. Rep. of Germany | 354/64 |
|---|---|---|---|
| 1043770 | 6/1952 | France | 354/64 |

*Primary Examiner*—Michael L. Gellner
*Attorney, Agent, or Firm*—Harold Gell

[57] ABSTRACT

A method and apparatus for pressure compensating an underwater housing by blowing up a balloon and sealing the balloon mouth around a conduit to pneumatically connect the balloon to the interior of the housing. The balloon is configured to change its appearance either structurally or via indicia to provide a variable indication as to what depth it will provide compensating air. The indication varies in response to the amount the balloon stretches to accommodate the air forced into the balloon as it is blown up.

23 Claims, 2 Drawing Sheets

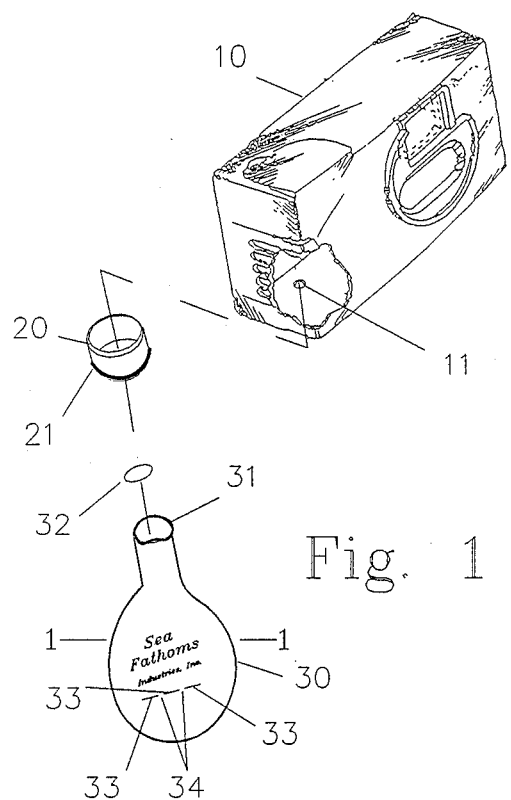
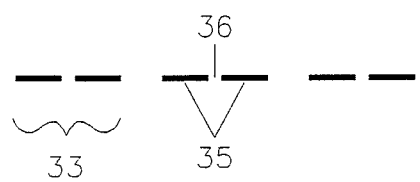
Fig. 2
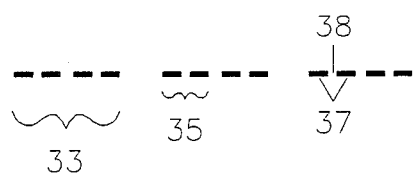
Fig. 3
Fig. 1
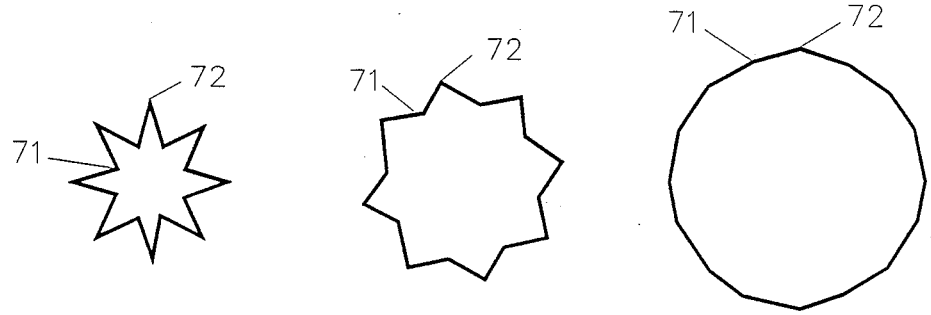
Fig. 7    Fig. 8    Fig. 9

PRESSURE COMPENSATION METHOD AND APPARATUS FOR UNDERWATER EQUIPMENT

RELATED APPLICATIONS

This is related to U.S. Pat. application Ser. No. 07/113,913 filed Oct. 29, 1987 for "Method And Apparatus For Underwater Operation Of Non-Waterproof Equipment" and issued Sept. 13, 1988 as U.S. Pat. No. 4,771,299; U.S. Pat. application Ser. No. 07/085,336 filed Aug. 14, 1987 for "Method And Apparatus For Extending The Depth Range Of Underwater Equipment" and issued Sept. 13, 1988 as U.S. Pat. No. 1,771,320; U.S. Pat. application Ser. No. 07/243,596 filed Sept. 12, 1988 for "Method And Apparatus For Extending The Depth Range Of Underwater Equipment" and issued Aug. 1, 1989 as U.S. Pat. No. 4,853,722; and is a continuation in part of U.S. patent application Ser. No. 07/491,094 filed Mar. 9, 1990 for "Pressure Compensation Method And Apparatus For Underwater Equipment", and which are hereby incorporated in this application by reference.

FIELD OF THE INVENTION

The present invention relates to the use of an inflated balloon to pressure compensate an underwater device and volume related variable indicia associated with the balloon to provide an indication of the operational depth range of the system based on the amount of air or gas forced into the balloon.

BACKGROUND OF THE INVENTION

The co-pending U.S. Pat. application Ser. No. 07/491,094 filed Mar. 9, 1990 for "Pressured Compensation Method And Apparatus For Underwater Equipment" discloses a system which uses a balloon to provide compensating air for an underwater device. This principle provides an inexpensive solution to pressure compensating underwater housings, however it has a drawback in that a first-timer user of the system may have difficulty in knowing exactly how much air to put into the balloon to compensate for a particular dive profile. If enough air is not placed in the balloon, the system may leak before the dive is completed or the apparatus within the waterproof housing may fail to function. Alternately, if too much air is placed in the balloon, the system will be unnecessarily buoyant and create handling problems.

OBJECTIVES OF THE INVENTION

A primary objective of the present invention is to provide a means whereby a balloon may be inflated with a predetermined volume of air or gas so that when it is pneumatically attached to an underwater housing it will provide the approximate amount of gas required to pressure compensate the underwater housing to the expected maximum ambient water pressure.

Another objective of the present invention is to provide indicia on a balloon which changes as the balloon stretches to indicate the volume of gas contained and to provide an indication of the operational depth limits of a pressure compensation system using the balloon as a gas source.

Another objective of the present invention is to provide a balloon for supplying pressure compensating gas to an underwater device wherein the balloon changes shape as a function of the amount of air or gas forced into the balloon and the changes are an indication of the operational depth limits of the system based on the gas within said balloon.

Another objective of the present invention is to provide a means whereby an inflated balloon bearing a volume responsive indicia may be pneumatically attached to an underwater housing to provide a source of pressure compensating gas to equalize the pressure within the underwater housing to a depth indicted by the idicia.

Another objective of the present invention is to provide a method for pressure compensating an underwater device to extend its operational depth limits.

SUMMARY OF THE INVENTION

The present invention includes a tube which is sealed around a hole in an underwater housing. A balloon is blown up until its external geometry or indicia on its surface indicates that it contains the proper volume of air required to pressure compensate the housing at a desired depth. The balloon's mouth is then sealed around the tube.

DESCRIPTION OF THE DRAWINGS

FIG. 1 illustrates an exploded view of the components comprising the invention.

FIG. 2 illustrates a depth indicating bar indicia as it appears for an intermediate depth range.

FIG. 3 illustrates an exemplary depth indicated bar indicia as it appears at a maximum depth indicating range.

FIG. 7 is a cross-section of an alternate embodiment of the invention taken along line 1—1 of FIG. 1 where the external configuration of the balloon serves as an indicator.

FIG. 8 a cross-section of an alternate embodiment of the invention taken along line 1—1 of FIG. 1 where the external configuration of the balloon serves as an indicator.

FIG. 9 is a cross-section of an alternate embodiment of the invention taken along line 1—1 of FIG. 1 where the external configuration of the balloon serves as an indicator.

DESCRIPTION OF THE INVENTION

Figure 4:
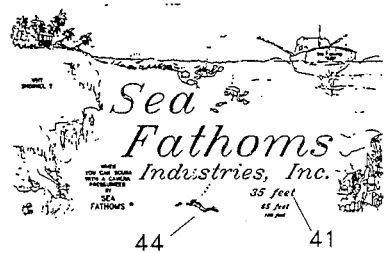
FIG. 4 a preferred embodiment of the invention where a depth indicating range is incorporated in a logo printed on the balloon and the balloon is blown up to the point where the logo is stretched to indicate a first depth limit.

In FIG. 1, the waterproof housing 10 of an underwater camera includes a small hole 11. A walled structure such as an open ended tube 20 is sealed around the hole. The tube 20 is provided with a ridge or bead 21 around the outer periphery of the tube to provide a means to hold the mouth 31 of the balloon 30 in place. If desired, a rubber band 32 or other clamping means may be used to increase the security of the balloon/tube seal. The relative sizes of the balloon and camera case are selected so that the capacity of the balloon will be sufficient for contemplated operations. The relative sizes of the tube, bead and balloon mouth are selected to allow the balloon mouth to stretch over the bead and form a gas tight seal about the tube.

To ensure that the balloon 30 contains the proper amount of gas to allow camera operation to the desired depths, an indicia comprised of a plurality of bars 33 spaced apart by a distance 34 are provided on the outer surface of the balloon 30. In the embodiment illustrated in FIG. 1, the space 34 between the bars 33 is such that when the balloon is completely deflated, the space is not visible. When the balloon is blown up to a point where the air within the balloon is sufficient to allow the camera to be operational to a depth of 30 feet, the space 34 between the bars 33 becomes apparent and the operator clearly sees three bars, indicating the device is operational to 30 feet.

The bars 33 may be segmented as illustrated in FIG. 2. In FIG. 2, each bar 33 is comprised of two sub bars 35 separated by a space 36 that does not become apparent until the indicia has stretched by air being forced into the balloon to equal a volume which will allow the system to be operational to a depth of 60 feet. Thus the operator sees a total of six bars indicating an operational depth of 66 feet.

Each of the sub bars 35 of FIG. 2 may be further divided into two bars, 37 as illustrated in FIG. 3 separated by a space 38. The space 38 is dimensioned such that it does not become apparent until the balloon is blown up with a sufficient quantity of air to allow the system to be operational to a depth of 120 feet. Thus when the balloon is blown to this extent, the indicia stretches and the user can clearly see a total of 12 bars, indicating an operational depth of 120 feet.

Figure 5:
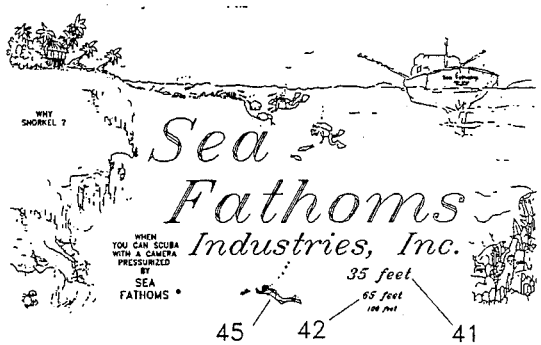
FIG. 5 illustrates a preferred embodiment of the invention where a depth indicating range is incorporated in a logo printed on the balloon and the balloon is blown up to the point where the logo is stretched to indicate a second depth limit.

In a preferred embodiment of the invention, the bars and spaces illustrated in FIGS. 1 through 3 are replaced by legible indicia within a logo identifying the balloon as a pressure compensation source. For instance, in FIG. 4 depth limiting indicia 41 is included in the logo in a size and configuration which will not become legible until the balloon is blown up with a volume of air that will provide operational compensating air to the indicated depth. In FIG. 4 that indicia spells out "35 feet". Thus when the operator desires to use the system to a depth no greater than 35 feet, he simply blows up the balloon until he can read 35 feet. The balloon is then connected to the waterproof housing. If a deeper depth is desired, the operator continues to blow up the balloon until the indicia appears as illustrated in FIG. 5 where depth indicia 41 and 42 are both visible, indicating that the system will now operate as deep as 65 feet. If it is anticipated that even deeper depths are required, the operator continues to blow up the balloon until all three indicia, 41, 42, and 43 are visible indicating a maximum depth of 100 feet as illustrated in FIG. 6.

Figure 6:
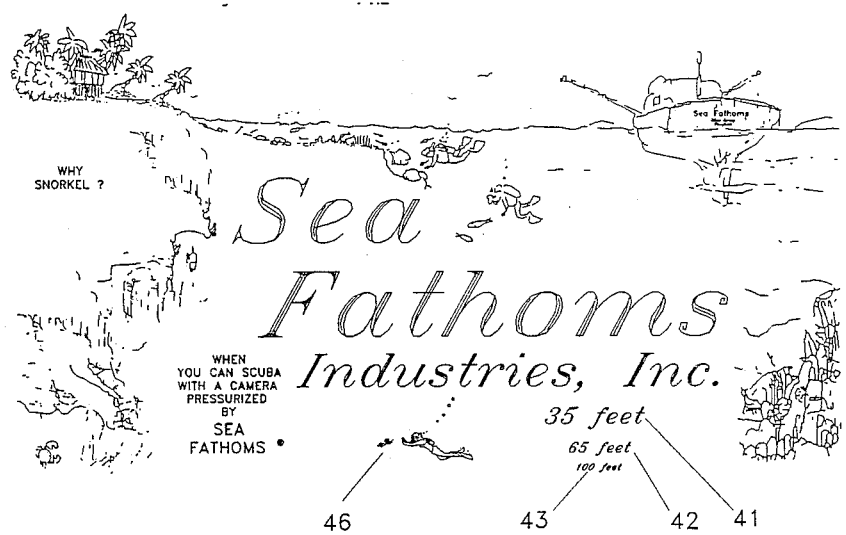
FIG. 6 illustrates a preferred embodiment of the invention where a depth indicating range is incorporated in a logo printed on the balloon and the balloon is blown up to the point where the logo is stretched to indicate a first, second and third depth limit.

In an alternate embodiment of the invention, the logo of FIGS. 4 through 6 may contain a design such as 44 of FIG. 4. The design is printed in a compressed form so that it is not clearly discernible until the container (balloon) stretches do to the addition of a predetermined volume of air calculated to allow operations to an indicated depth. This second condition is indicated by the increased size of the image in FIG. 5 where it is clear that the design contains a diver 45. As the image increases in size do to the further addition of air in FIG. 6, it becomes evident that the design contains two fish 46. This and the other techniques suggested herein may be designed to provide any degree of scale refinement desired. For instance, the design could contain two elements to provide a three step range as illustrated or it could contain a hundred elements to provide a hundred step range.

If printed indicia are not practical or desirable for indicating the operational depth limit of the system, the indicia may be provided by forming the balloon so that its external geometry changes as more air is forced into it. For instance, the balloon may include a plurality of pleats which will provide a tactile indicia. In this situation, when the balloon is partially inflated, the pleats around the balloon will be clearly visible and easily felt as indicated by FIG. 7 which is a cross section of the balloon taken along lines 1—1 of FIG. 1. It illustrates how the balloon would appear when partially inflated to provide air for operations to a shallow depth. Note that the grooves or depressions 71 around the circumference of the balloon are deep to provide a clear distinction from the configuration illustrated in FIG. 8 where the grooves have become shallower and the points 72 spaced farther apart to give an indication that the system may be used at a deeper depth, such as 60 feet. In FIG. 9, the cross section of the balloon becomes spherical due to the volume of air forced into it and the grooves 71 and 72 are no longer easily distinguishable, indicating that the balloon now contains enough air to allow system operations to a depth of 120 feet.

The method of using the invention includes the steps of blowing up the balloon to a volume sufficient to provide the gas or air needed for pressure compensation at the anticipated operational depth as indicated by one of the indicia system previously described. The volume of gas is calculated according to Boyle's Law to be equal to the gas volume within the underwater housing at a first ambient pressure for operations at an increased pressure of one atmosphere. In other words, if the operational depth is to be around 33 feet or 10 meters, the balloon is blown up with a gas volume equal to the gas volume of the housing and the indicia is designed to provide the proper indication. If the depth is two atmospheres greater than sea level or 66 feet (20 meters), the volume of the gas should be equal to two times the volume of the housing and for 99 feet or 30 meters, three times the housing volume.

This pressure/volume relationship may be used in a reverse manner to approximate the size of the lettering or spaces in the visual indicia on the balloon. For instance, if the lettering 41 of FIG. 6 is dimensioned so that it is just clearly visible when the balloon is inflated but the latex of the balloon has not stretched, and the volume of the balloon is this condition equals the volume of the housing to be protected, then the indicia can be approximately 33 feet plus an additional depth which is within the range of the uncompensated housing.

Because the balloon is a sphere, the size variation of the lettering of the indicia or the dimensions of the space between the indicia bars is not a linear function with respect to volume. For instance, assume the waterproof housing has a volume of 170 cubic centimeters, and the housing can function without compensation at a nominal depth of 10 feet. In this scenario, the volume of the balloon would have to be 130 cubic centimeters to allow an operational depth of approximately 35 feet. This requires that the balloon be blown up to approximately 2 ½ inches in diameter. This would provide a circumference of 7.8 inches around which the indicia may be printed. If the indicia is printed so that it is legible at this size, it may be used to indicate a depth of 35 feet. If the system is to be used to a depth of 65 feet, the diameter of the balloon must be approximately 3 ¼ inches to provide enough compensating air to completely equalize the pressure at a depth within 10 feet of the desired 65 foot mark. The circumference of the 3 ¼ inch diameter balloon is approximately 10.2 inches so the indicia indicating the 65 foot depth must be printed large enough to be visible when the surface of the balloon is stretched from 7.8 inches to 10.2 inches in circumference but invisible when the circumference is only 7.8 inches. If the system is to be submerged to a depth of 100 feet, the diameter of the balloon must be approximately 3 ¾ inches and this extends the circumference of the balloon from 10.2 inches to 11.8 inches. Thus the 100 foot indicia must be large enough to be visibly significant when the surface of the balloon is stretched to 11.8 inches in circumference but invisible when stretched to 10.2 inches.

When the balloon is properly inflated, its mouth is stretched over the bead around the top of the tube and allowed to seal with out losing gas during the operation. A clamp may be placed around the balloon neck and tube to improve the seal and balloon retention.

While preferred embodiments of this invention have been illustrated and described, variations and modifications may be apparent to those skilled in the art. For instance, instead of a balloon, a container fabricated from a flexible elastic material may be used. It will stretch as the balloon when filled with air to provide the same stretch related volume indicating indicia described for the various exemplary embodiments using a balloon. If a tactile indicia is all that is needed, the container need not stretch. The pleats will unfold as air fills the container and causes the pleats to open and increase the volume of the device. Therefore, I do not wish to be limited thereto and ask that the scope and breadth of this invention be determined from the claims which follow rather than the above description.

What I claim is:

1. A pressure compensation system for an underwater device comprising:
   a variable volume gas container for supplying pressure compensating gas to said underwater device; said container fabricated from a material which stretches to increase the volume of said container; and
   indicia on the exterior surface of said container which stretches with said container for indicating operational depth of the pressure compensation system as a function of the volume of gas within said container.

2. An apparatus as defined in claim 1, wherein said indica comprises:
   a series of bars printed on said container and spaced apart by a first distance which is not visibly discernible when the container material is stretched less than a predetermined value.

3. A pressure compensation system for an underwater device as defined in claim 2 wherein said first distance becomes visibly discernible when said container has been stretched by the addition of a predetermined volume of gas required to enable the pressure compensation system to function to a predetermined depth which is indicated by the discernability of said first distance space.

4. A pressure compensation system for an underwater device as defined in claim 3 wherein said series of bars includes bars separated by a second distance which is visibly discernible only when said container has been stretched by the addition of a second predetermined volume of gas required to enable the pressure compensation system to function to a second predetermined depth which is indicated by the discernability of said first and second distance spaces.

5. A pressure compensation system for an underwater device as defined in claim 4 wherein said series of bars includes bars separated by a third distance which is visibly discernible only when said container has been stretched by the addition of a third predetermined volume of gas required to enable the pressure compensation system to function to a third predetermined depth which is indicated by the discernability of said first, second and third distance spaces.

6. An apparatus as defined in claim 1, wherein said indica comprises:
   a design printed on said container in a compressed form so that at least a portion of said design is not visibly discernible when the container material is not stretched.

7. A pressure compensation system for an underwater device as defined in claim 6 wherein a portion of said design becomes visibly discernible when said container has been stretched by the addition of a volume of gas required to enable the pressure compensation system to function at a depth which is indicated by the discernability of said portion of said design.

8. A pressure compensation system for an underwater device as defined in claim 6 wherein a second portion of said design becomes visibly discernible when said container has been stretched by the addition of a volume of gas required to enable the pressure compensation system to function at a depth which is indicated by the discernability of said second portion of said design.

9. A pressure compensation system for an underwater device as defined in claim 1 wherein said idicia is tactile.

10. A pressure compensation system for an underwater device as defined in claim 9 wherein said indica is a plurality of pleats in the material of said container which become increasingly flattened and less discernible as the container material is flexed by the addition of gas.

11. An apparatus as defined in claim 1, wherein said indica comprises:
    characters printed on said container in a compressed form so that one or more are not visibly discernible when the container material is not stretched.

12. A pressure compensation system for an underwater device as defined in claim 11 wherein a group of said characters becomes visibly discernible when said container has been stretched by the addition of a volume of gas required to enable the pressure compensation system to function at a depth which is indicated by the discernability of said group of characters.

13. A pressure compensation system for an underwater device as defined in claim 12 wherein a second group of said characters becomes visibly discernible when said container has been stretched by the addition of a volume of gas required to enable the pressure compensation system to function at a depth which is indicated by the discernability of said second group of characters.

14. A pressure compensation system for an underwater device as defined in claim 13 wherein a third group of said characters becomes visibly discernible when said container has been stretched by the addition of a volume of gas required to enable the pressure compensation system to function at a depth which is indicated by the discernability of said third group of characters.

15. A pressure compensation system for an underwater device as defined in claim 1 wherein said indica is a group of characters printed on said container in an increasingly compressed form which become increasingly visibly discernible as the container material is stretched by the addition of gas.

16. A pressure compensation system for an underwater device comprising:
   a balloon for supplying pressure compensating gas to said underwater device; and
   indica on the exterior surface of said balloon which stretches with said balloon and indicates operational depth of the pressure compensation system as a function of the volume of gas within said balloon.

17. An apparatus as defined in claim 16, wherein said indica comprises:
   a series of bars printed on said balloon and spaced apart by one or more distances which are not visibly discernible until the balloon is stretched by a volume of gas which is indicated by the number of said distances rendered visibly discernible.

18. A pressure compensation system for an underwater device as defined in claim 16 wherein said indica is a group of characters printed on said balloon in an increasingly compressed form which renders at least one group visibly indiscernible when said balloon is not stretched, and said characters become increasingly visibly discernible as said balloon is stretched by the addition of gas.

19. An apparatus as defined in claim 16, wherein said indica comprises:
   a design printed on said balloon in a compressed form which becomes increasingly visibly discernible as the balloon is stretched by the addition of gas.

20. An apparatus as defined in claim 16, wherein said indica tactile:
   a design printed on said balloon in a compressed form which becomes increasingly visibly discernible as the balloon is stretched by the addition of gas.

21. A method for pressure compensating an underwater device, including the steps of:
   blowing up a balloon with a volume of gas sufficient to equalize the pressure within said underwater device at the operational depth indicated by indica which stretches and thus becomes discernible as the balloon stretches while being blow up; and sealing the mouth of said balloon over an open conduit into said underwater device.

22. A method for pressure compensating an underwater device as defined in claim 21 wherein said indica are tactile.

23. A pressure compensation system for an underwater device comprising:
   a variable volume gas container for supplying pressure compensating gas to said underwater device; said container fabricated from a pleated flexible material which expands by opening the pleats to increase the volume of said container; and said pleats comprise tactile indica which become increasingly flattened and less discernible as the container material is flexed by the addition of gas to thereby provide an indication relative to the volume of gas within said container.

* * * * *

UNITED STATES PATENT AND TRADEMARK OFFICE
CERTIFICATE OF CORRECTION

PATENT NO. : 4,947,783

DATED : August 14, 1990

INVENTOR(S) : Gell, Jr.

It is certified that error appears in the above-identified patent and that said Letters Patent is hereby corrected as shown below:

Column 1, line 14, "1,771,320" should read --4,771,320--

Signed and Sealed this

Twenty-ninth Day of October, 1991

*Attest:*

HARRY F. MANBECK, JR.

*Attesting Officer*        *Commissioner of Patents and Trademarks*